Sept. 26, 1967     N. J. FRANZ     3,344,010

SPINWELDING DEVICE

Filed Dec. 7, 1964     2 Sheets-Sheet 1

INVENTOR.
Norman J. Franz

BY *John V. Johnson*

ATTORNEY

INVENTOR.
Norman J. Franz
BY
ATTORNEY

# United States Patent Office 3,344,010
Patented Sept. 26, 1967

3,344,010
SPINWELDING DEVICE
Norman J. Franz, Colerain Township, Hamilton County, Ohio, assignor to The Procter and Gamble Company, Cincinnati, Ohio, a corporation of Ohio
Filed Dec. 7, 1964, Ser. No. 416,239
5 Claims. (Cl. 156—582)

This invention relates to an improved device for friction welding of two or more thermoplastic members and more particularly, to spinwelding apparatus adapted to seal a thermoplastic closure to the finish of a thermoplastic container at a high throughput rate.

It is well known that thermoplastic parts may be united by pressing the parts together and moving one at high speed relative to the other so that the contacting surface of each is heated to its melting point, forming a molten interface between the parts, whereupon the relative rotation is stopped and the interface allowed to cool under pressure. In this manner an integral connection is made between the parts, one which is strong and as impermeable and chemically resistant as the materials of the parts themselves. Many prior art devices are available for performing this process; however, to date such devices have not been successfully employed in connection with high speed production facilities. One of the underlying reasons for the failure of the prior art devices in such an application is that insufficient control of the parts being joined has prevented the consistency of operation necessary for the formation of strong uniform bonds therebetween when there are minor deviations from the norm in the quality of the parts to be joined. Thus, the prior art devices might be successfully employed with respect to certain of the package components being handled on the production line, but unsuccessful with a large proportion of the total output of the devices over a period of time.

Another reason for such failure of the prior art devices is due to the fact that many use a discontinuous drive system for imparting the relative movement between the components being joined, e.g., a clutch or other device for interrupting rotational movement of machine parts causing such relative movement. This necessitates a longer cycle in order to develop frictional heat required to form the molten interface because acceleration of the parts to operating speed from a dead stop entails a finite period of time. Moreover, the deceleration phase of the cycle adds to the length thereof. In addition, discontinuous drive systems inherently present maintenance and adjusting problems to manufacturers employing them.

A further reason for the failure of some prior art devices is that in the critical transitional period between the spinning and the chill or solidification phases of the spinwelding cycle, such devices permit a momentary relaxation of pressure acting to force the parts together. This change of pressure is believed to be a major reason for the production of welds of inconsistent quality.

A still further shortcoming in the prior art devices concerns the appearance of the outer surface of the component on which the pressure is exerted. In many cases it has been found that portions of this surface are burnished by the prior art devices and present an obvious appearance defect which is a severe negative if the components united comprise a package for consumer goods.

It is an object of the present invention to obviate the above problems.

Another object of the present invention is to provide a spinwelding device capable of consistent successful operation given a range of tolerances within which the plastic parts to be joined may vary.

Still another object is to provide spinwelding apparatus which is capable of successful, relatively maintenance-free operation in connection with supplies varying within reasonable limits in quality, which exerts constant, unrelaxed and undiminished pressure during the transition from spinning to solidification of the molten joint, which restricts burnishing of the parts to be joined to portions which do not present appearance defects and which is applicable for use on high speed production equipment such as rotary type machines.

Briefly stated, in accordance with one aspect of this invention, there is provided spinwelding apparatus adapted to secure a thermoplastic closure to the finish of a thermoplastic container. The device incorporates a continuously rotating mandrel adapted to engage and impart high speed rotational movement to the closure relative to the finish whereby to form a continuous molten interface therebetween. The machine incorporates a platform on which the container is vertically supported during the spinwelding cycle and employs a chuck by means of which the container is held stationary on the platform in axial alignment with the mandrel. A downwardly-biased, vertically reciprocative, non-rotatable sleeve surrounds the mandrel and supports, at the lower end thereof, a pressure applying surface of frusto-conical shape sized to contact the periphery of the closure at points substantially overlying the finish of the container. The peripheral contact is maintained and exerts a constant pressure on the closure and container during the portion of the spinwelding cycle in which the mandrel engages the closure and for a finite period of time thereafter to thereby abruptly terminate rotational movement of the closure and to permit rapid formation of a welded joint along the interface.

While the specification concludes with claims particularly pointing out and distinctly claiming the subject matter of the instant invention, it is believed that the invention will be better understood from the following description taken in connection with the accompanying drawings, in which:

The spinwelding head or device of the instant invention is particularly useful in connection with a rotary type machine wherein a plurality of the devices are arranged to move in a circular path. Machines of this type usually include a plurality of vertically movable platforms arranged in a circular pattern beneath the spinwelding heads, there being one platform beneath each head. A container is placed on each successive platform at a loading station and a closure is loosely placed in position on top of the finish of each container being fed through the machine. As a container is carried in the circular path by the machine, the platform which supports it causes the container to be raised into and lowered out of operative position with the spinwelding heads by means of a cooperating cam track which is designed so that each container goes through a complete spinwelding cycle. A description of all the details of the machine itself is not thought to be necessary since these do not form an essential part of the instant invention.

Figure 1:
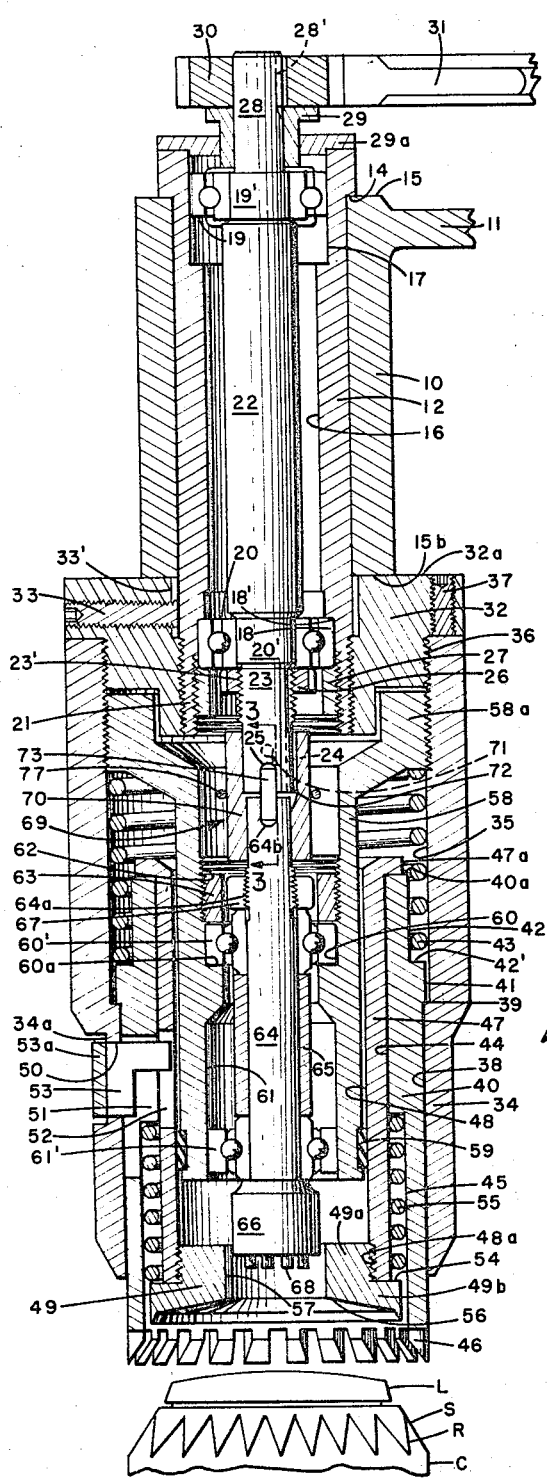
FIGURE 1 is a vertical sectional view of a preferred embodiment of a spinwelding device of the present invention.

The present invention will be best understood by reference to FIGURE 1 wherein there is shown a spindle support boss 10 which provides the sole means of attachment of the spinwelding head to the balance of the machine. The boss 10 is one of a multiplicity of such supports equally spaced about and integrally formed with the periphery of a spider type casting 11 which comprises a part of the rotating turret of a rotary machine. Thus, the spindle support boss 10 is adapted to travel in a circular path with the balance of the movable components of the rotary machine. An upper shaft bearing sleeve 12 is telescoped within the bore 13 of the boss 10, being supported vertically by the engagement of the annular shoulder 14 on the upper surface 15 of the boss 10. The sleeve 12 has an axial bore 16, which is recessed at 17 and 18 to accept the outer races of bearings 19 and 20 in a tight sliding fit. Immediately below the recess 18 the diameter of the bore is further increased, producing a thin cylindrical distal end 21 which is threaded both internally and externally.

An upper spindle shaft 22 is coaxially supported within the bore 16 of the upper shaft bearing sleeve 12. Journals 19' and 20' of the shaft 22 are of reduced diameter and adapted to be pressed within the inner race of the respective bearings 19 and 20. The lower end 23 of the shaft 22 is of slightly smaller diameter than the journal 20' with the upper portion thereof threaded at 23' and the lower portion provided with a keyway 24 and diametrically slotted at 25. An internally threaded nut 26 is applied to the thread 23', thereby forcing the inner race of bearing 20 against the shoulder formed between the journal 20' and the larger central portion of the shaft 22. An externally threaded nut 27 is engaged with the internal thread of the cylindrical distal end 21 of the upper shaft bearing sleeve, pressing the outer race of the bearing 20 against the annular shoulder 18' intermediate the central portion of bore 16 and the recess 18. Thus, the shaft 22 is held firmly within the bore of the upper shaft bearing sleeve 12 by means of the nuts 26 and 27.

The upper end 28 of the shaft 22 is turned down to a smaller diameter and provided with a keyway 28'. A spacer 29 is telescoped over the end 28, with its lower portion resting on the inner race of bearing 19. The upper end of spacer 29 is flanged and thereby adapted to vertically support pinion 30 which is affixed to the shaft 22 by means of a key engaged within the keyway 28' and a corresponding keyway in the pinion bore. The teeth of the pinion 30 are engaged with those of a "bull" gear or spindle drive gear 31, which in turn is driven by a center drive shaft (not shown) of the rotary machine. It is the bull gear which imparts the rotational movement to the revolving portions of the spinwelding head. A dust cover 29a surrounds the spacer 29 and encloses the top of upper shaft bearing sleeve 12 to prevent dirt and dust from entering the interior of the spinwelding device.

A chuck adaptor ring 32 has an internally threaded bore engaged with the exterior threads on the cylindrical distal end 21 of the upper shaft bearing sleeve 12. The upper surface 32a of the ring 32 bears against the lower surface 15b of the boss 10; thus, as the adaptor ring is screwed on the sleeve 12, the sleeve is pulled downwardly, seating the shoulder 14 firmly against the surface 15 of the boss and maintaining the sleeve immobile in position within the spindle support boss 10. A horizontally disposed set screw 33 in the sidewall of the ring 32 is tightened against the outer surface of the sleeve 12 to prevent the loosening of the chuck adaptor ring thereon. The annular recess 33' is provided merely to give sufficient spacing between the mating ring and sleeve to prevent interference to relative movement therebetween if the surface of sleeve 12 becomes burred by the set screw 33.

The balance of the mechanism illustrated in FIGURE 1 comprises the chuck portion of the spinwelding head. The chuck is enclosed by an outer sleeve 34 which vertically supports the members comprising the chuck and provides the means by which the chuck is engaged and axially aligned with the above described spindle portion of the apparatus. The engagement is effected by a threaded portion of the bore 35 of the chuck sleeve 34 which is screwed onto a threaded shoulder 36 of the chuck adaptor ring 32. A set screw 37 extends vertically through the chuck adaptor ring 32 and is adapted to prevent relative rotational movement between the adaptor ring 32 and the chuck sleeve 34.

The bore 35 of the chuck sleeve 34 is stepped down in diameter at the lower end, thereby forming a guideway 38 and a stop shoulder 39 located at the top thereof. An annular nest 40 which is telescoped within the chuck sleeve 34 has an outer surface which is a few thousandths smaller in diameter than the guideway 38, whereby a smooth free sliding fit between the guideway and nest results. A circumferential band-like enlargement 41 is located in the upper portion of the nest, being slightly larger in diameter than the guideway 38 and smaller than the internal diameter of the upper portion of the bore 35. When the nest 40 is placed within the guideway 38 of the chuck sleeve 34, in its lowermost position the underlying shoulder of the enlargement 41 will bottom on the stop shoulder 39. The portion of the periphery of the nest above the enlargement 41 is recessed as at 42, permitting a nest spring 43 to be accepted intermediate the nest 40 and the chuck sleeve 34. The lower end of nest spring 43 is designed to bear against the shoulder 42' formed at the intersection of the recess 42 and the enlargement 41, biasing the nest downwardly.

An axial bore 44 extends lengthwise through the nest 40 and commencing at about the midpoint of its length, the lower end of the bore is enlarged in the form of a counterbore 45. The internal surface at the bottom of the nest 40 is beveled outwardly from the counterbore 45 and that end of the nest is radially slotted to produce a multiplicity of similarly configured toothlike protuberances 46 equally spaced thereabout and comprising the lower nest surface.

A cylindrical bushing 47 is telescoped within the nest 40, with its outer surface in free sliding engagement with the bore 44. The bushing 47 has a flange 47a formed at the top thereof which when resting on the top surface 40a of the nest 40 prevents further downward movement of the bushing relative to the nest 40. The distal end of the central bore 48 of the bushing 47 is internally threaded at 48a so as to provide for the securement thereon of the pressure pad 49 described below.

Means is provided to prevent relative rotation of the outer chuck sleeve 34, nest 40 and bushing 47. Although this could be accomplished in a number of ways, in the illustrated embodiment slots 50, 51 and 52 are provided, respectively, in the chuck sleeve 34, nest 40 and bushing 47, in radial alignment with one another. A key 53 extends radially inwardly and is affixed to the chuck sleeve 34 by means such as machine screws (not shown) fastening the flange 53a thereof to a flat 34a formed in the outer surface of sleeve 34 contiguous to the slot 50. The inwardly extending key 53 projects through each of the aforementioned slots 50, 51 and 52, terminating short of the inside surface of the bore 48. As will be realized from inspection of the heights of the slots 51 and 52, the nest 40 and the bushing 47 are permitted to reciprocate axially within limits, but are not free to rotate relative to the chuck sleeve 34.

The pressure pad 49 has a central bore 57 therethrough and a hub 49a which is threadedly engaged with the portion 48a of the bore of bushing 47. The body 49b of the pressure pad 49 extends radially outwardly to a diameter intermediate that of the outer surface of the bushing 47 and the counterbore 45 of the nest. These dimensional differences result in the formation of an annular ledge 54 which has a width sufficient to support and transmit pressure from the pressure pad spring 55 enclosed between the counterbore 45 and the bushing 47. The lower surface 56 of the pressure pad is shaped frustoconically, terminating in a downwardly turned lip, for the purpose to be described hereinafter. The pressure pad 49 may be made of any suitable material such as steel, but might desirably be formed of a material having a high rate of heat conductivity, for example, copper or brass, where it appears to be necessary to dissipate frictional heat during the spinning operation. The surface 56 is preferably finished to a very high luster, as close to specular as is possible, as for example by applying a highly polished chrome coating thereto. Such a finish has a low coefficient of friction in combination with thermoplastics which are desirable for use in packaging and for this reason will reduce the possibility of burnishing the package component acted upon by the pressure pad 49.

A lower shaft bearing sleeve 58 has its enlarged upper end 58a secured to the threaded portion of the bore 35 of the chuck sleeve 34, underneath the adaptor ring 32. The balance of the sleeve 58 projects axially downwardly into the bore 48 of the bushing 47, in spaced relation therewith. An annular dust seal 59 is affixed within a groove in the lower portion of the sleeve 58, projecting outwardly into sealing contact with the interior of the bore 48. The seal is desirably constructed of neoprene or other suitable resilient material.

The bearing sleeve 58 is centrally bored and provided with recesses 60 and 61 therein sized to accept the outer races of bearings 60' and 61' in a tight sliding fit. Immediately above the recess 60, the bore is threaded at 62 and an externally threaded nut 63 is engaged therewith, pressing the outer race of the bearing 60' against the shoulder 60a defining the lowermost extent of the recess 60.

A lower spindle shaft 64 is pressed through the inner races of bearings 60' and 61', a bearing spacer 65 being used to maintain a predetermined distance between the inner races of the bearings. The lowermost end of the spindle shaft 64 is enlarged into a mandrel 66, the top shoulder of which is in contact with the lower surface of the inner race of bearing 61'. Immediately above the bearing 60', the shaft 64 is reduced in diameter. The lower end 64a of the reduced portion is threaded and the upper portion has a diametrical slot 64b formed therethrough. A nut 67 is applied to the threaded portion 64a, bearing against the top surface of the inner race of the bearing 60'. By means of the nuts 67 and 63, the shaft 64 is maintained in a fixed position with respect to the bearings and the assembly is supported within the lower shaft bearing sleeve 58.

The mandrel 66 has a plurality of drive pins 68 protruding downwardly therefrom a uniform distance, the pins being arranged in a circular pattern and equally spaced from one another. In the embodiment shown six pins are utilized although this could be varied depending upon the number and pattern configuration of the apertures in the closure to be applied. This will be more fully understood from the subsequent description.

Figure 3:
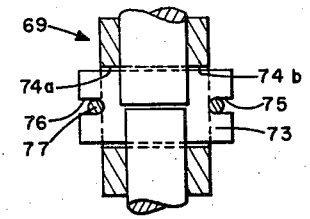
FIGURE 3 is a fragmentary sectional view taken along line 3—3 of FIGURE 1.

The lower spindle shaft 64 and the upper spindle shaft 22 are in direct alignment and are slightly spaced from one another in assembled condition. A coupling generally referred to as reference numeral 69 is used to transmit rotary movement of the upper shaft 22 to the lower shaft 64. This coupling comprises a collar 70 which is stepbored internally to accept the differing diameters of the respective shafts 22 and 64. The collar 70 is affixed to the upper shaft 22 by means of a set screw 71 and a keyway-key arrangement 72 within the upper portion of the bore of the collar 70. The collar has a pair of radial, diametrically opposed, centrally located slots 74a and 74b, see FIGURE 3, dimensioned to accept a coupling key 73 of a length slightly in excess of the outer diameter of the coupling collar 70. The coupling key 73 is adapted to fit within the diametrical slots 25 and 64b at the contiguous ends of each of the shafts 22 and 64, whereby to link the shafts together for rotational movement. The ends of the coupling key 73 are slotted at 75 and 76 to a sufficient depth whereby the length of the coupling key intervening is approximately equal to the outer diameter of the collar 70. A split annular retainer ring 77 is applied over the coupling collar 70, extending through the slots 75 and 76 to retain the coupling key 73 in position in the collar 70.

Figure 2:
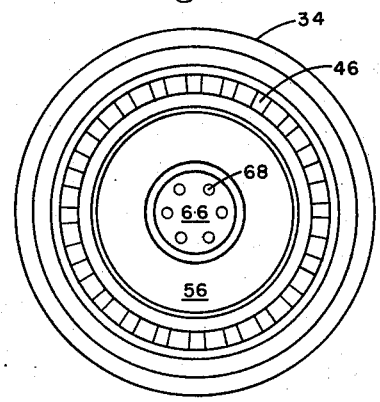
FIGURE 2 is a bottom plan view of the device of FIGURE 1.

To emphasize a few of the significant features of the above described mechanism, it will be realized that rotation of the bull gear 31 will drive the pinion 30 which in turn causes the upper spindle shaft 22 to rotate. The coupling 69 transmits the rotational drive to the lower shaft 64 and consequently to the mandrel 66 thereon. The nest 40 is axially movable within the outer chuck sleeve 34, the nest spring 43 causing the nest to be biased to its lowermost position. Similarly, the pressure pad 49 which is mounted on the bushing 47 is axially movable relative to the nest 40 and chuck sleeve 34, also being biased downwardly by the pressure pad spring 55. As shown in the lower plan view of FIGURE 2, all of the elements of the device are concentrically located. Thus, when the protuberances of the nest 40 are used to align the container C axially therein, this simultaneously aligns the container with the mandrel 66 and the projecting pins 68.

Figure 4:
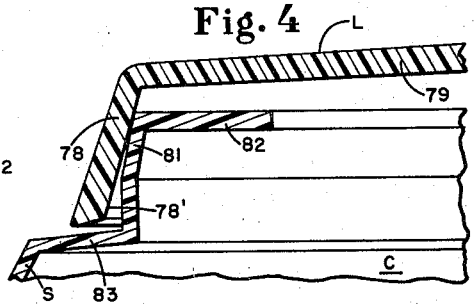
FIGURE 4 is an enlarged fragmentary vertical cross-sectional view illustrating the configuration of the closure and the finish of the container to which the closure is to be joined, prior to the spinwelding operation.
Figure 5:
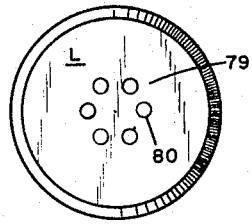
FIGURE 5 is a top plan view of the closure.

FIGURE 4 illustrates the configuration of the closure or lid L and the finish of the container C. The center of top wall 79 of closure L is the high point of the cap and the top wall slants downwardly slightly towards its periphery, along which is provided a downwardly and outwardly extending sidewall 78. Although the relationships can be varied, it has been found that a sidewall 78 having an inner surface 78' thereof at an angle of 15° with the vertical has performed very satisfactorily in connection with the container finish illustrated. The central portion of the top wall 79 of the cap, see FIGURE 5, is provided with a multiplicity of apertures 80 intended to eventually function as means for egress of the product to be packaged within the container C. The size of the apertures and their relative location and configuration is such as to include a pattern substantially identical to that of the pins 68 at the lower end of mandrel 66. The purpose of this identity is to permit engagement of the pins within the apertures, as will be described.

The finish of the container C extends upwardly and includes an inwardly tapered frusto-conical side portion 81 which in section is desirably oriented at about 12° with the vertical. A horizontal flange 82 extends inwardly a short distance from the top of the side portion 81. The height of the flange 82 above the shoulder 83 of the container slightly exceeds the internal height of the sidewall 78. In addition, as will be realized from the disclosure of FIGURE 4, the internal diameter of the sidewall 78 is slightly less than the smallest external diameter of the finish side portion 81, causing the top of the side portion 81 to contact the interior surface 78' of the cap sidewall 78 along a circular line spaced from the top wall 79 and therefore short of bottoming within the cap.

Below the shoulder 83 the frusto-conical shoulder S slopes downwardly and outwardly to the sidewall of the container. The shoulder S is provided with ribs or a raised design R and is inclined at approximately the same angle as the beveled interior surfaces of the protuberances 46. During the spinning operation to be described, the protuberances are intended to seat on the shoulder S with the ribs or raised design R projecting into some or all of the slots therebetween to prevent relative rotation. Thus, the ribs will bear a definite relationship in number and spacing to the slots.

In forming the spinweld, the closure L is spun rapidly in relation to the finish side portion 81 whereby the contacting material therebetween is acted upon by the generated heat of friction. This heat causes a thin circular molten interface to be formed between the package components. As the spinning continues and a constant pressure is continuously exerted downwardly on the periphery of the closure L overlying the flange 82, the melting described above permits the closure to move downwardly relative to the finish. Eventually, a substantial portion of the upper end of finish side portion 81 and closure surface 78' will have a molten interface formed thereon and if spinning is continued, this will permit the closure L to seat on the flange 82 and the heat of friction will start to similarly affect the outer periphery of the upper surface of the flange 82 and the contacting lower face of closure top wall 79. Thus, by means of the described configurations of the closure and the finish, the width of the interface gradually progresses from a circular line at the initial line of contact between the side portion 81 of the finish and the sidewall 78 of the closure, along a progressively increasing width of band to the undersurface of the cap top wall 79 and therealong to some extent, if necessary, between the top wall and the outer portion of the flange 82. To form a good weld between the package parts it is desirable that the band be at least about one-sixteenth of an inch in width.

Figure 8:
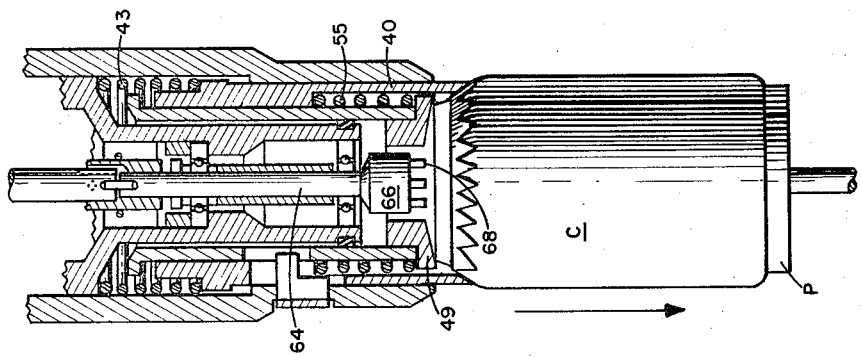
FIGURE 8 is a fragmentary vertical sectional view similar to FIGURES 6 and 7 showing the completed package at the chill elevation following the spinning of the closure and subsequent to the lowering of the container.
Figure 7:
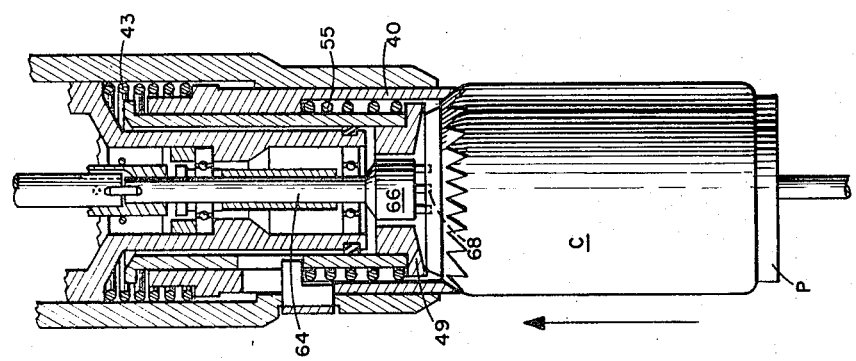
FIGURE 7 is a fragmentary vertical sectional view similar to FIGURE 6, illustrating the spinwelding device, the closure and container at the spin elevation.
Figure 6:
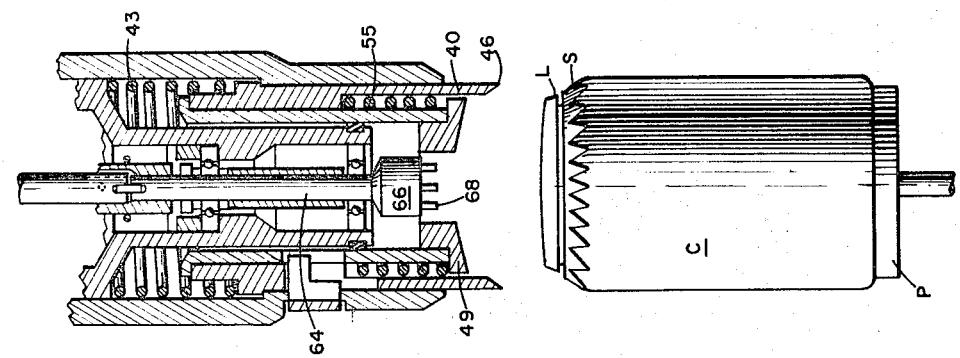
FIGURE 6 is a fragmentary vertical sectional view illustrating the apparatus of FIGURE 1 and the container and closure to be joined, prior to the commencement of the spinwelding cycle.

The operation of spinwelding with the present invention is presented in FIGURES 6 through 8, FIGURE 6 shows the container with the closure loosely placed thereon in position, in approximate alignment with the nest 40, on the platform P which underlies the illustrated spinwelding head. At this time the mandrel 66 is being driven at continuous rotational speed in the range of from about 1500 to 5000 r.p.m. and the nest 40 and pressure pad are both maintained in their lowermost positions by the bias of the springs 55 and 43.

FIGURE 7 shows the condition of the container C, lid L and the spinwelding head following the raising of the container C to the spin elevation in which spinning of the closure L relative to the container C is accomplished. As the platform P moves the package components upwardly toward the spin elevation, the pressure pad 49 contacts the periphery of the closure L. Subsequent upward movement causes compression of the pressure pad spring 55 and the nest spring 43 thereby exerting a predetermined amount of force in the range of from about one-half to twenty pounds on the portion of the closure L overlying the flange 82 of the container. Further movement results in the engagement of the protuberances 46 with the shoulder S of the container C as described above. The beveled surfaces of the protuberances and the downwardly turned lip and beveled surface 56 of the pressure pad causes the loosely assembled container parts to shift slightly to correct any minor misalignment with the spinwelding head. The raising of the container is then opposed by further compression of the nest spring 43, which exerts sufficient downwardly directed force to maintain the container in position and to eliminate any tendency of the container to rotate. It should be noted that once the nest 40 has contacted the container C shoulder S, the pressure exerted by the pressure pad 49 on the periphery of the closure L will remain substantially constant since the deflection of the pressure pad spring 55 does not thereafter change to any substantial degree. Any increased pressure exerted by the further compression of nest spring 43 will be borne by the container.

Next, the pins 68 of the continuously rotating mandrel 66 come into contact with the top wall 79 of the closure L, depressing it until the container has reached a height at which the pins may enter the apertures 80, creating a drive connection between the closure L and mandrel 66 whereupon the closure L is rotated at high speed. Due to the fact that the outer chuck sleeve 34 is non-rotatably affixed to the chuck adaptor ring 32 and since the key 53 prevents relative rotation between the sleeve 34, nest 40 and bushing 47, the container and the pressure pad are maintained in stationary condition during the period of time in which the lid L is being rotated. As described above, the relative rotation of the lid on the container finish causes a molten interface to be formed therebetween. It will be recognized that since the closure L is rotated under pressure contact with the pad 49 there is a distinct possibility that the contacting surface of the closure will be burnished. However, the contacting surface is the periphery of the closure top wall and so such burnishing will be restricted to the corner intersection of the top wall 79 with the closure sidewall 78 where it is not noticeable, leaving the broad top surface of the closure unmarked.

Following the lapse of sufficient time to create a molten interface to the extent desired, usually between about one-quarter to about one second, the platform P is moved downwardly causing the container to be lowered to its freeze or chill elevation of FIGURE 8 in which it is below the level of the mandrel drive pins 68. The action of the nest spring 43 and the pressure pad spring 55 maintains the closure L in position on the finish of the container and strips the package components from engagement with the pins 68 whereby the relative rotation of the closure and container is abruptly terminated. During this transition period (as the package components are moved from the spin to the chill elevations) and during the solidification phase of the cycle, the peripheral pressure exerted by the pressure pad 49 remains constant and continuous, substantially identical with the pressure exerted at the spin elevation. The package is maintained in the freeze position with the spring pressure still in effect for a period of time sufficient for the molten interface to solidify, usually about one-quarter to about one second, thus uniting the closure L to the finish of the container C.

Next the platform is again lowered to a position approximating that shown in FIGURE 6 and the completed container is removed by apparatus which is not illustrated since it forms no part of the present invention.

Because of its construction, the chuck of the spinwelding head may be rapidly removed and replaced for maintenance or with a chuck of different size in the event it is desired to produce different size packages. In addition, it will be recognized that the continuously rotating mandrel which almost instantaneously brings the closure up to welding speed and the non-rotatable pressure pad which brakes the closure extremely rapidly to a non-rotating condition without burnishing the surface thereof, combine to reduce the spinwelding cycle to a minimum and thus makes high speed production of the package feasible.

Many modifications of the above invention may be used and it is not intended to hereby limit it to the particular embodiments shown or described. The terms used in describing the invention are used in their descriptive sense and not as terms of limitation, it being intended that all equivalents thereof be included within the scope of the appended claims.

What is claimed is:

1. Spinwelding apparatus adapted to secure a thermoplastic closure to the finish surrounding the open mouth of a thermoplastic container, said apparatus comprising:
 (A) a platform on which said container is supported during the spinwelding operation, said platform being movable vertically to place the container and closure sequentially in a spin elevation, a freeze elevation which is below the spin elevation and a loading and unloading position below the freeze elevation;
 (B) a continuously rotatable mandrel mounted vertically above and in substantial alignment with said platform, said mandrel being adapted to engage and impart high speed rotational movement to said closure when the container and closure are raised by said platform into the spin elevation;

(C) means for continuously rotating said mandrel;

(D) a downwardly biased, vertically reciprocative, non-rotatable bushing surrounding and concentric with said mandrel, said mandrel being rotatably mounted in said bushing, said bushing having at the lower end thereof a pressure applying surface adapted to contact and apply a constant and continuous pressure to the top of the said closure, said contact being made and maintained when the container and closure are in the spin elevation and the freeze elevation whereby to press the closure against the container finish while the closure is rotated by the mandrel and to abruptly terminate said rotation when the container and closure are lowered to said freeze elevation, and (E) a downwardly biased, vertically reciprocative, non-rotatable nest surrounding said bushing, said bushing being vertically reciprocative relative to and independent of said nest, said nest being adapted to engage and hold said container stationary on said platform with the mouth thereof in substantial axial alignment with said mandrel and sleeve when the container and closure are in the spin and freeze elevation.

2. The apparatus of claim 1 in which the mandrel has a multiplicity of equally sized drive pins depending from its lower surface, the top wall of the closure is provided with a multiplicity of apertures arranged in a pattern identical with that of the drive pins of the mandrel and the engagement of the mandrel and closure is effected by the drive pins entering the apertures.

3. The apparatus of claim 1 in which said pressure applying surface is of frusto-conical shape and the contact with said closure is restricted to contact with the periphery of the top wall of the closure, whereby any burnishing of the closure is confined to a narrow band at said periphery.

4. The apparatus of claim 3 in which said pressure applying surface is provided with a highly polished friction reducing coating to substantially minimize burnishing.

5. The apparatus of claim 1 in which the nest has a substantial number of tooth-like protuberances arranged in a circular path at its lower end and the engagement of the container by the nest is by means of said protuberances.

References Cited

UNITED STATES PATENTS

| | | | |
|---|---|---|---|
| 2,393,883 | 1/1946 | Broderson | 156—67 |
| 2,853,118 | 9/1958 | Schnitzius | 18—5 |
| 3,078,912 | 2/1963 | Hitzelberger | 156—582 |

OTHER REFERENCES

Robert M. Freres: Modern Plastics, November 1945, vol. 23, No. 3, pp. 142–145.

JOHN F. CAMPBELL, *Primary Examiner.*

M. L. FAIGUS, *Assistant Examiner.*